US011247697B2

(12) United States Patent
Van Dijk et al.

(10) Patent No.: US 11,247,697 B2
(45) Date of Patent: Feb. 15, 2022

(54) OBJECT-DETECTION SYSTEM CALIBRATION

(71) Applicant: NXP B.V., Eindhoven (NL)

(72) Inventors: Lucas Pieter Lodewijk Van Dijk, Kranenburg (DE); Cornelis Gehrels, Eindhoven (NL)

(73) Assignee: NXP B.V., Eindhoven (NL)

( * ) Notice: Subject to any disclaimer, the term of this patent is extended or adjusted under 35 U.S.C. 154(b) by 332 days.

(21) Appl. No.: 16/021,934

(22) Filed: Jun. 28, 2018

(65) Prior Publication Data
US 2019/0077412 A1 Mar. 14, 2019

(30) Foreign Application Priority Data
Sep. 11, 2017 (EP) .................................. 17190365

(51) Int. Cl.
| | |
|---|---|
| *B60W 50/04* | (2006.01) |
| *G01S 13/87* | (2006.01) |
| *G01S 7/497* | (2006.01) |
| *G01S 7/40* | (2006.01) |
| *G01S 7/03* | (2006.01) |

(Continued)

(52) U.S. Cl.
CPC .............. *B60W 50/045* (2013.01); *B60R 1/00* (2013.01); *B60R 11/04* (2013.01); *G01S 7/003* (2013.01); *G01S 7/032* (2013.01); *G01S 7/40* (2013.01); *G01S 7/497* (2013.01); *G01S 13/87* (2013.01); *G01S 13/931* (2013.01); *G01S 17/87* (2013.01); *G01S 17/931* (2020.01); *G06K 9/00791* (2013.01); *G06K 9/6262* (2013.01); *B60R 2300/105* (2013.01); *B60W 2050/0086* (2013.01); *B60W 2420/42* (2013.01); *G01S 7/4026* (2013.01); *G01S 2013/9327* (2020.01); *G01S 2013/9329* (2020.01)

(58) Field of Classification Search
CPC ....... B60W 50/045; B60W 2050/0086; B60W 2420/42; G01S 2013/9327; G01S 2013/9329; G01S 7/497; G01S 7/40; G01S 17/931; G01S 13/87; G01S 7/032; G01S 13/931; G01S 17/87; G01S 7/003; G01S 7/4026; B60R 1/00; B60R 11/04; B60R 2300/105; G06K 9/00791; G06K 9/6262; H04L 2012/40273
See application file for complete search history.

(56) References Cited

U.S. PATENT DOCUMENTS 5,814,771 A * 9/1998 Oakes ................ G01G 23/48
177/136
2005/0052950 A1 3/2005 Klinnert et al.
(Continued)

FOREIGN PATENT DOCUMENTS

| | | | |
|---|---|---|---|
| DE | 10122664 A1 * | 11/2002 | ........... G01S 7/4972 |
| DE | 10122664 A1 | 11/2002 | |
| EP | 2090897 A1 | 8/2009 | |

*Primary Examiner* — Donald J Wallace (57) ABSTRACT

The disclosure relates to a processing module and associated method for calibrating an object-detection system for a vehicle comprising a plurality of object-detection sensors. The method comprises receiving, from each of a plurality of the object-detection sensors, a value associated with the detection of a marker; and determining a position of each of the object-detection sensors with respect to the vehicle based on the received values associated with the detection of the marker.

13 Claims, 4 Drawing Sheets

(51) Int. Cl.
  *G01S 13/931*  (2020.01)
  *G01S 17/87*   (2020.01)
  *G01S 7/00*    (2006.01)
  *G01S 17/931*  (2020.01)
  *B60R 1/00*    (2022.01)
  *B60R 11/04*   (2006.01)
  *G06K 9/00*    (2022.01)
  *G06K 9/62*    (2022.01)
  *B60W 50/00*   (2006.01)

(56) References Cited

U.S. PATENT DOCUMENTS

| | | | | |
|---|---|---|---|---|
| 2010/0076709 | A1* | 3/2010 | Hukkeri | G01S 17/87 |
| | | | | 702/94 |
| 2012/0290169 | A1* | 11/2012 | Zeng | G01S 7/4026 |
| | | | | 701/30.2 |
| 2017/0261599 | A1* | 9/2017 | Zeng | G01S 7/4026 |
| 2018/0372841 | A1* | 12/2018 | Hieida | G08G 1/16 |

* cited by examiner

OBJECT-DETECTION SYSTEM CALIBRATION

CROSS-REFERENCE TO RELATED APPLICATIONS

This application claims priority under 35 U.S.C. § 119 to European patent application no. EP 17190365.1, filed Sep. 11, 2017, the contents of which are incorporated by reference herein.

The present disclosure relates to an object-detection system for a vehicle and an associated method of calibrating the object-detection system.

According to a first aspect of the present disclosure there is provided a processing module for an object-detection system for a vehicle that comprises object-detection sensors, the processing module configured to, in a calibration mode:
  receive, from each of a plurality of the object-detection sensors, a value associated with the detection of a marker; and
  determine a position of each of the object-detection sensors with respect to the vehicle based on the received values associated with the detection of the marker.

In one or more embodiments, the processing module is further configured to, in the calibration mode, associate for subsequent use in a sensing mode, each of the object-detection sensors with the determined position of that particular object-detection sensor.

In one or more embodiments, the processing module is further configured to, in the calibration mode, reassign respective identifiers of one or more of the object-detection units based on the values associated with the detection of the marker. The processing module may be further configured to, in the calibration mode, reassign respective identifiers of one or more of the object-detection units based on detection of the marker by one or more of the object-detection sensors.

In one or more embodiments, the processing module is further configured to associate each of the plurality of object-detection sensors to one of a plurality of pre-designated possible physical locations based on the values associated with the detection of the marker. The processing module may be further configured to associate each of the plurality of object-detection sensors to one of a plurality of pre-designated possible physical locations based on detection of the marker by one or more of the object-detection sensors.

In one or more embodiments, each value associated with the detection of the marker comprises one of:
  (i) a distance or relative distance between one of the object-detection sensors and the marker, or a related quantity such as a time of flight measurement;
  (ii) a vector defining a relationship between the object-detection sensors and the marker; or
  (iii) a time at which one of the object-detection sensors detected the marker.

According to a further aspect there is provided an object-detection system having:
  the processing module of any preceding claim; and
  a plurality of object-detection sensors, each object-detection sensor configured to detect a marker in the calibration mode.

In one or more embodiments, each object-detection sensor has a memory comprising a pre-assigned, unique identifier. The identifier may be a pre-assigned, unique identifier. The object-detection sensor may comprise an imaging system.]

In one or more embodiments, the object-detection sensors are mutually interchangeable, fungible or have indistinguishable hardware.

In one or more embodiments, the object-detection sensors each have the same connector configuration.

According to a further aspect there is provided a vehicle comprising the object-detection system.

Also disclosed is a processing module for an object-detection system that comprises object-detection sensors, the processing module configured to, in a calibration mode:
  receive, from each of a plurality of the object-detection sensors, a value associated with the detection of a marker; and
  determine a position of each of the object-detection sensors based on the received values associated with the detection of the marker.

According to a further aspect there is provided a method for calibrating an object-detection system for a vehicle comprising a plurality of object-detection sensors, the method comprising:
  receiving, from each of a plurality of the object-detection sensors, a value associated with the detection of a marker; and
  determining a position of each of the object-detection sensors with respect to the vehicle based on the received values associated with the detection of the marker.

Also disclosed is a method for calibrating an object-detection system comprising a plurality of object-detection sensors positioned about a vehicle, the method comprising:
  detecting a marker using each object-detection sensor; and
  determining a position of each of the object-detection sensors with respect to the vehicle based on the detecting of the marker by the object-detection sensors.

In one or more embodiments, the marker is situated off-centre with respect to the vehicle.

In one or more embodiments, the method further comprises determining a set of first values associated with the detection of the marker by each of the object-detection sensors. The method may further comprise assigning the position of each of the object-detection sensors based on the set of first values.

In one or more embodiments, the method further comprises determining whether the same first value has been determined by two or more of the object-detection sensors.

In one or more embodiments, the method further comprises moving the marker with respect to the object-detection system. The method may comprise determining a set of second values associated with the detection of the marker by each of the object-detection sensors. The method may comprise assigning the position of each of the object-detection sensors based on the set of first values and the set of second values.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Object-detection systems for vehicles are used in order to provide advanced safety features such as automatic braking and lane recognition, for example. A typical object-detection system comprises a plurality of object-detection sensors. Each object-detection sensor may have a similar object-detection functionality. Radar units are a common example of object-detection sensors.

The object-detection system is required to address each electronic control unit in the system. In the case that the electronic control units provide the functions of object-detection sensors, addressing each unit entails providing the unit with a unique identifier and associating the unit with a position on the vehicle.

A difficulty encountered in conventional object-detection systems relates to how to address the object-detection sensors in an efficient manner.

Figure 1:
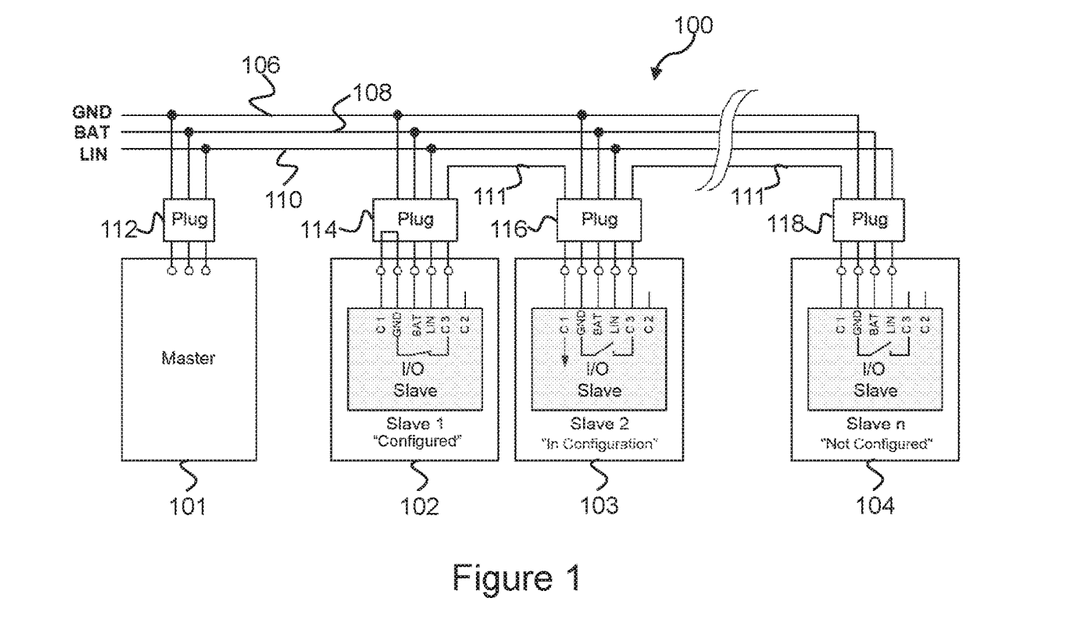
FIG. 1 shows a schematic diagram of an example of an object-detection system comprising object-detection sensors provided in a daisy change configuration.
Figure 2:
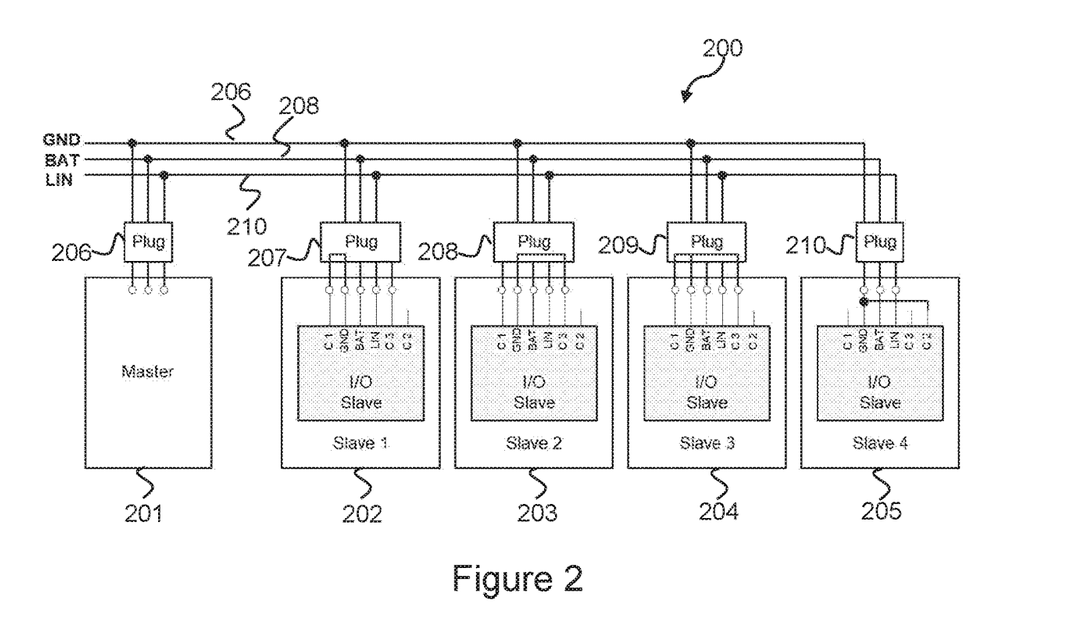
FIG. 2 shows a schematic diagram of an example of an object-detection system comprising object-detection sensors addressable using plug coding.

FIGS. 1 and 2 relate to example object-detection systems in which the address of the object-detection sensors are hard coded using prior knowledge of, in the case of FIG. 1, the order that the object-detection sensors are provided along a bus in a daisy chain configuration and, in the case of FIG. 2, prior knowledge of the different connector configurations used by each of the object-detection sensors. A different approach is taken in the example of FIG. 3 in which an object-detection system addresses various object-detection sensors by determining the impedance at each of the object-detection sensors and relying on the impedance varying along lines of the system bus. Finally, an improved system for associating each object-detection sensor with a position on the vehicle is discussed with reference to FIGS. 4 and 5. A calibration mode for the system of FIG. 4 is described with reference to FIG. 5. In the calibration mode, the position of the object-detection sensors with respect to the vehicle is determined by detecting a marker using the object-detection sensors. The determined position of each object-detection sensor may then be associated with an identifier of that particular object-detection sensor. The determined positions of the sensors may then be used subsequently in a sensing mode to determine a position of an object with respect to the vehicle. In this way, the provision of the calibration mode may enable one of a set of identical object-detection sensors to be placed at any required position in a vehicle without the need for manual configuration of the object-detection sensors to associate each object-detection sensor with a position about the vehicle. In this way, a plug-and-play-type object-detection system may be provided.

FIG. 1 illustrates an object-detection system 100 comprising a plurality of object-detection sensors 101-104. The object-detection sensors 101-104 include a master object-detection sensor 101, a first slave object-detection sensor 102, a second slave object-detection sensor 103 and an $n^{th}$ slave object-detection sensor 104. The slave object-detection sensors 102-104 are provided in a daisy change configuration. Each object-detection sensor 101 to 104 is connected to a serial bus comprising a ground line 106, a power line 108 and a data line 110 and a further data line 111 for daisy-chaining.

The master object-detection sensor 101 has a plug 112 with three connections. The three connections are used to couple the master object-detection sensor 101 to the respective lines 106, 108, 110 of the serial bus.

In order to aid manufacture, the internal configuration of each of the slave object-detection sensors 102-104 is identical. Each slave object-detection sensor has an internal connection for ground, power and data. In addition, each object-detection sensor has internal connections C1, C2 and C3 to assist in the addressing of the slave object-detection sensors 102-104.

Each slave object-detection sensor 102-104 has a plug 114, 116, 118. Each plug 114, 116, 118 has a different set of connections with the internal connections of the slave object-detection sensors 102-104 in order to enable daisy chaining between the sensors via the further data line 111. Each plug 114, 116, 118 provides a connection between the object-detection sensors 102, 103, 104 and the serial bus and the further data line 111. The plug 114 of the first slave object-detection sensor 102 connects C1 to ground and provides an external connection for C3. The plug 116 of the second slave object-detection sensor 103 provides external connections for C1 and C3. In the example shown, the plug connection C3 on the first slave object-detection sensor 102 is connected to the plug connection C1 of the second slave object-detection sensor 103 via the further data line 111. The plug 118 of the third slave object-detection sensor 104 provides an external connection for C1. The plug connection for C3 of the second slave object-detection sensor 103 is connected to the plug connection C1 of the nth slave object-detection sensor 104 via the further data line 111. The internal connections that are not mentioned here are not provided with external connections by the various plugs 114, 116, 118.

The slave object-detection sensors 102-104 are each configured to determine their position along the daisy chain by interrogating their respective internal connections C1, C2, C3 in a configuration mode.

In this way, an additional line is introduced between the identical modules in order to realise auto-addressing of the modules using the daisy chaining method.

FIG. 2 illustrates a schematic block diagram for another object-detection system 200 comprising a plurality of object-detection sensors 201 to 205. In this example, a location on a vehicle is a priori associated with an identity of an object-detection sensor. The identity may be assigned to a particular object-detection sensor using plug coding.

The object-detection sensors 201 to 205 are connected to a serial bus that is similar to that described previously with reference to FIG. 1 by respective plugs 206 to 210. In this example, the external connections of each of the plugs 206 to 210 are identical and the internal connections of the slave object-detection sensors 202 to 205 differ from one another, and are implemented using the plugs 207 to 210.

The plug 207 of the first slave object-detection sensor 202 connects C1 to ground. The plug 208 of the second object-detection sensor 205 connects C3 to ground. The plug 209 of the third slave object-detection sensor 204 connects C1 and C3 to ground. The plug 210 of the fourth slave object-detection sensor 205 connects C2 to ground. In this way, the plug 207 to 210 of each slave object-detection connector is modified in order to realise auto addressing. It is necessary to manually configure each of the plugs in order to conform the plug configuration for each slave object-detection sensor 202-205 with a corresponding plug configuration that is associated with a predefined position within the vehicle. Such manual configuration is time consuming and subject to error by the technician implementing the daisy-chain arrangement. In addition, the requirement to implement additional connector pins increases PCB size.

The examples shown in FIGS. 1 and 2 are based on examples of electronic control units for other, non-object-detecting applications, and may be implemented using LIN based data communication. Such examples may also be implemented using CAN-FD or Ethernet. The particular data communication standard used to implement the examples is unimportant.

Figure 3:
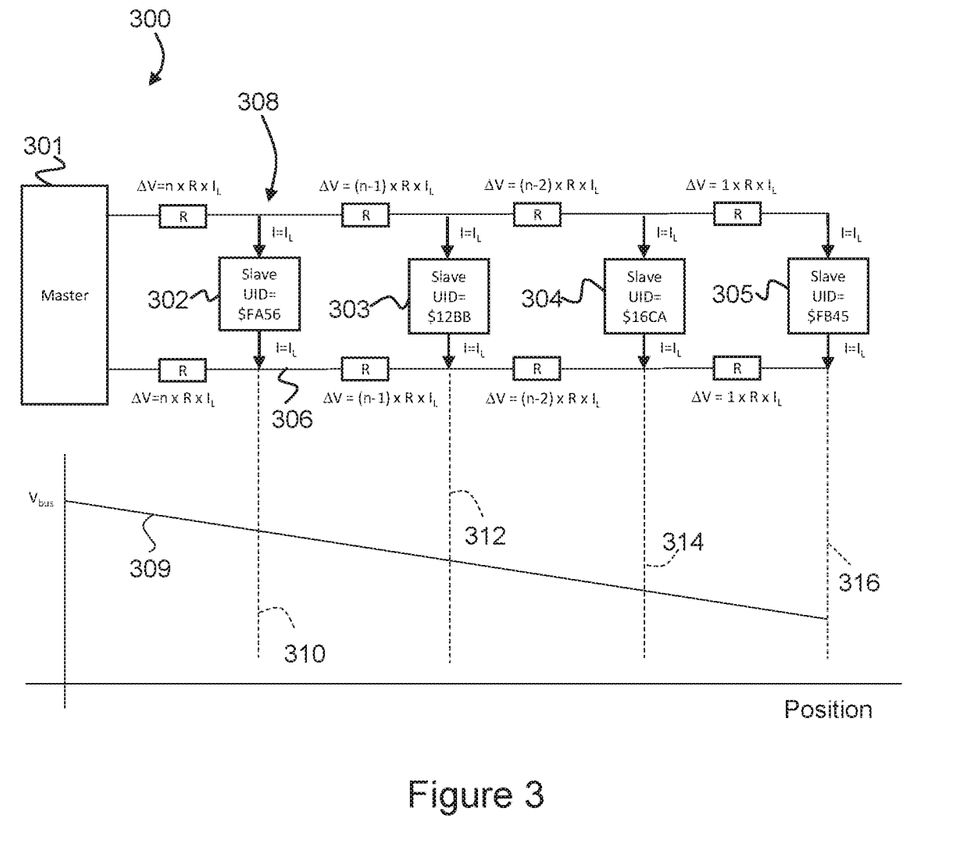
FIG. 3 shows a schematic diagram of an example of an object-detection system comprising object-detection sensors addressable by cable impedance detection.
Figure 4:
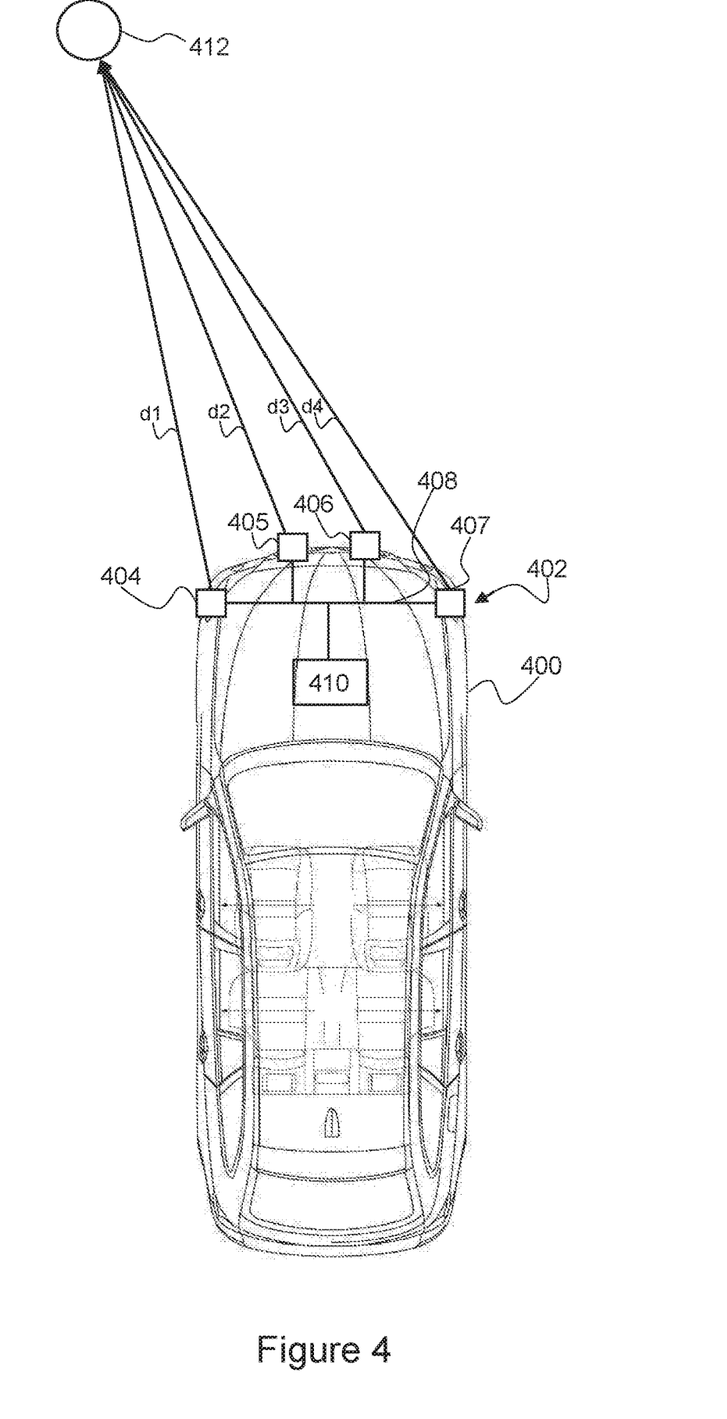
FIG. 4 shows a schematic diagram of an example of an object-detection system comprising object-detection sensors in a calibration mode.

FIG. 3 illustrates a schematic diagram of an object-detection system 300 comprising a plurality of object-detection sensors 301-305. The object-detection sensors 301-305 include a master object-detection sensor 301 and slave object-detection sensors 302-305. As in the examples described previously with reference to FIGS. 1 and 2, the slave object-detection sensors 302-305 are connected to the master object-detection sensor 301 by a serial bus. In this example, not all lines of the serial bus are shown. A power line 308 and a ground line 306 of the serial bus are shown in FIG. 3. Each slave object-detection sensor 302-305 may be assigned a unique identifier. The slave object-detection sensors 302-305 are connected in parallel between the power line 308 and ground line 306 of the serial bus and an impedance is therefore provided along the lines between each slave object-detection sensor 302-305, and between the first slave object-detection sensor 302 and the master object-detection sensor 301. The bus voltage Vbus 309 therefore varies as a function of distance along the serial bus lines 306, 308 and the various slave object-detection sensors 302-305 may each receive a different bus voltage Vbus 309 from one another. Each slave object-detection sensor 302-305 may therefore determine its position along the line, and therefore its distance from the master object-detection sensor 301 by determining the bus voltage. In this way, the position of the object-detection sensor may be determined based on a pre-arranged route for the bus line to take through the vehicle. The bus voltage determined at each slave object-detection sensor 302-305 is therefore a unique quantity for each slave object-detection sensor 302-305 and so may be used to assign, or re-assign, an address for that slave object-detection sensor 302-305.

FIG. 3 also shows a profile of the bus voltage Vbus 309 as a function of position. The bus voltage Vbus drops as the position of the slave object-detection sensor 302-305 increases along the bus line. In this example, the bus voltage Vbus 310 is greater at the first slave object-detection sensor 302 than the bus voltage Vbus 312 at the second slave object-detection sensor 303, and greater still than subsequent bus voltages Vbus 314, 316 associated with the further away object-detection sensors 304, 305. A difficulty with this approach is that sensitive measurements of line voltage or impedance are required at the various slave object-detection sensors 302-305, resulting in the need for additional hardware and increased circuit complexity.

FIG. 4 illustrates a vehicle 400. The vehicle 400 may be a road vehicle, and is an automobile in this example. An object-detection system 402 is installed in the vehicle 400. The object-detection system 402 has a plurality of object-detection sensors 404-407 and a processing module 410. In the example illustrated in FIG. 4, the processing module 410 is provided by a separate functional unit from the object-detection sensors 404-407. Alternatively, the processing module may be provided in one of the object-detection sensors, or may be distributed among two or more of the object-detection sensors.

Each object-detection sensor 404-407 is configured to detect a marker 412 using, for example, optical, acoustic or radio (such as RADAR) signals. Each object-detection sensor 404-407 may comprise an imaging system for generating an image of a field of view in which the marker can be placed. The marker 412, which may be considered to act as a fiducial marker, may be provided by any object or image that is machine-recognisable in a conventional manner. Detecting the marker using a particular object-detection sensor 404 may comprise generating a detection timestamp associated with the instant at which the marker 412 was first detected by that object-detection sensor 404. Detecting the marker 412 using a particular object-detection sensor 404 may comprise determining a distance between that object-detection sensor 404 and the marker 412. The distance may be a scalar quantity. Detecting the marker 412 using a particular object-detection sensor 404 may comprise determining a vector by the object-detection sensor 404 with respect to the marker 412.

In this example, the object-detection sensors are mutually interchangeable. The object-detection sensors 404-407 are fungible in that they each have the same functionality, and the hardware of each object-detection sensor 404-407 is indistinguishable from that of another object-detection sensor 404-407; the object-detection sensors 404-407 each have the same connector configuration in contrast to the examples described previously with reference to FIGS. 1 and 2. The external (and internal) connections of the object-detection sensors 404-407 are therefore the same as one another. Each object-detection sensor has a memory comprising a pre-assigned, unique identifier, such as a serial number, that enables the processing module to distinguish between the different object-detection sensors 404-407 when communicating with the object-detection sensors 404-407 via, for example, a data bus connection 408. The data bus connection 408 may be implemented using a Controller Area Network (CAN), Controller Area Network Flexible Data-Rate (CAN-FD) or an Ethernet variant. In general, communication between the object-detection sensors 404-407 and the processing module 410 may be facilitated by a wired or wireless network.

In this example, the object-detection sensors 404-407 are provided at the front of the vehicle and look outward from the vehicle in order to capture a forward-facing field of view. The plurality of object-detection sensors 404-407 may comprise more than two units, such as four units or six units, for example. The object-detection sensors 404-407 may be provided in or on the vehicle.

The processing module 410 has a calibration mode, and may also have a standard sensing mode. In the standard sensing mode, the processing module 410 is configured to determine, in a conventional manner, information about the environment surrounding the vehicle using data obtained by the object-detection sensors 404-407 and knowledge of the location of the object-detection sensors 404-407 about the vehicle. The knowledge of the location of the object-detection sensors 404-407 is obtained during the calibration mode.

Calibration may be performed by a vehicle manufacturer (original equipment manufacturer) during vehicle testing at the end of the manufacturing process. Calibration is performed after the object-detection sensors 404-407 have been installed about the vehicle 400. The location of each of the plurality of object-detection sensors 404-407 about the vehicle 400 is not a priori known to the system 402 that is to be calibrated. Initially, before calibration, the location with respect to the vehicle is therefore not associated with an identity of each object-detection sensor 404-407.

Initially, before calibration, the memory of each object-detection sensor 404-407 may be interrogated by the processing module 410 to obtain the pre-assigned, unique identifier associated with each object-detection sensor 404-407. Interrogation of the object-detection sensors 404-407 may be performed by, for example, performing a binary search to identify all object-detection sensors 404-407 present on a system data bus.

During calibration, each of a plurality of the object-detection sensors 404-407 detects a marker and generates a value associated with the detection of the marker. The detection of the marker may be performed by an image recognition process in a conventional manner. A value associated with the detection of the marker by each of the object-detection sensors 404-407 may comprise:

a distance or relative distance between one of the object-detection sensors and the marker, or a related quantity such as a time of flight measurement;

a vector defining a relationship between the object-detection sensors and the marker; or a time at which one of the object-detection sensors detected the marker.

Figure 5:
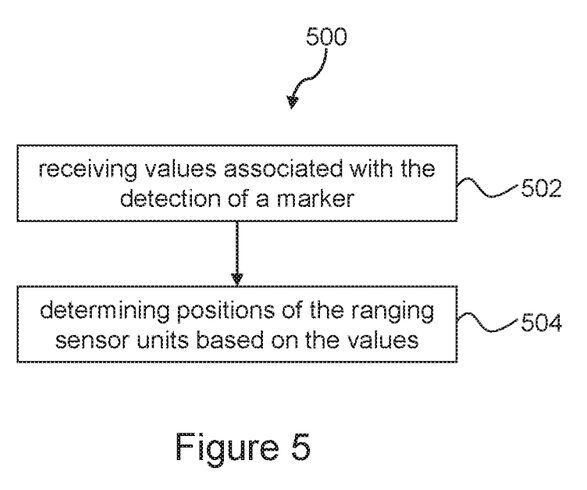
FIG. 5 shows an example of a method for calibrating an object-detection system.

FIG. 5 illustrates a method 500 for calibrating an object-detection system, which may be used in the calibration mode of the processing module of FIG. 4, for example. The calibration method 500 comprises:

receiving 502, from each of a plurality of the object-detection sensors 404-407, a value associated with the detection of the marker; and determining 504 a position of each of the object-detection sensors 404-407 with respect to the vehicle 400 based on the received values associated with the detection of the marker 412.

In this way, the position of each of the object-detection sensors 404-407 is determined in situ, which enables identical hardware to be used to provide interchangeable object-detection sensors 404-407 without, for example, having to modify a connector fitting of the units to identify the chosen location of the respective units, as was the case in the example of FIGS. 1 and 2. The method also enables the position of each object-detection sensors 404-407 to be detected without the need to accurately measure line impendences and so circuit complexity may be reduced compared with the example in FIG. 3.

The determined position of each object-detection sensor 404-407 may then be associated with that particular object-detection sensor 404-407 for subsequent use in the standard sensing mode. In this way, the position of the object-detection sensors 404-407 may be used when calculating the relative position of an object of interest that is detected by the object-detection sensors 404-407 during the standard sensing mode.

Various other optional aspects of the calibration method of FIG. 5 are discussed below with reference to the example object-detection system 400 illustrated in FIG. 4.

The vehicle 400 may provide a number of pre-designated possible physical locations, or bays, for installing an object-detection sensor 404-407. The pre-designated possible physical locations may be known to the system 402 (and, in particular, to the processing module 410). The processing module 410 may determine which object-detection sensor 404-407 is provided in each pre-designated possible physical location based on the detection of the marker 412 by the object-detection sensors 404-407.

The detection of the marker 412 may generate a time associated with the detection of the marker 412, such as when the marker 412 is first seen by a particular object-detection sensor. Alternatively, detection of the marker 412 may comprise determining a distance or relative distance between each of the object-detection sensors 404-407 and the marker 412. The ability to determine a distance from one of the object-detection sensor 404-407 and the marker 412 may be provided on board that particular object-detection sensor 404-407. In such cases, the determined distances may be sent by the object-detection sensors 404-407 to the processing module 410.

In some examples, more than one marker, either simultaneously or sequentially, may be used in order to reduce the possibility of ambiguity based on the detection of one marker 412.

Each of the object-detection sensors is individually addressable within the system using a pre-assigned unique identifier that is stored in the memory of the respective object-detection sensors. The identifier may be a machine address for identifying a particular object-detection sensor during machine communications. The identifier of one or more of the object-detection units may be reassigned based on the detection of the marker by the object-detection sensors. The reassigned address may be simplified compared to the pre-assigned address and so reduce the bandwidth needed for machine addressing in subsequent data packet transmission during the sensing mode. For example, the bit length of the reassigned address may be less than the bit length of the pre-assigned address. The reassigned address may also be determined to correspond with a logical sequence of the object-detection sensors based on their physical location (for example, sequentially numbered from near-side to off-side of the vehicle) in order to assist in identifying components to a user during future diagnostic testing.

In some examples, the calibration method comprises:

determining a first distance between each of the object-detection sensors and the marker;

determining whether the same distance has been determined by two or more of the object-detection sensors;

for object-detection sensors with different readings, assigning the position of each of the object-detection sensors based on the first distance between that particular object-detection sensor and the marker;

manually moving the marker with respect to the object-detection system;

determining a second distance between each of the object-detection sensors and the marker; and assigning the position of each of the object-detection sensors that determined the same first distance based on the first and second distances between that particular object-detection sensor and the marker. Such examples may use sets of first and second detection times instead of sets of first and second distances between the object-detection sensors and the marker. Further iterations of the method may take place in the event that identical or similar readings from different object-detection sensors persist. The marker may be moved with respect to the object-detection system by driving the vehicle.

The marker may be situated off-centre with respect to the vehicle in order to reduce the possibility that a pair of object-detection sensors 404-407 both detect the same distance between the respective object-detection sensors 404-407 and the marker 412. It may be preferable for the marker 412 to be provided to the side of vehicle 400 to ensure that the marker 412 is sufficiently off-centre.

Information about the position of the marker 412 may be received by the processing module 410 from a user interface (not shown). In some examples, the system 410 comprises the user interface. The information received from the user interface may include an indication whether the marker 412 is situated towards the left-hand side or the right-hand side of the Vehicle (or offside/near side). The processing module 410 may be configured to use the information received from the user interface to determine the position of the object-detection sensors 404-407 with respect to the vehicle. For example, the information received from the user interface may be used to remove ambiguity in whether sensors are spaced apart from left to right or right to left.

In some examples, the distance that is considered by the processing module may be a component of a distance along a set of Cartesian axes defined with respect to the vehicle (for example: x=lateral displacement, y=vertical displacement, z=forward-direction displacement).

In the example shown in FIG. 4, a first object-detection sensor 404 is a first distance d1 from the marker 412, a second object-detection sensor 405 is a second distance d2 from the marker 412, a third object-detection sensor 406 is a third distance d3 from the marker 412, and a fourth object-detection sensor 407 is a fourth distance d4 from the marker 412. In this case, the fourth distance d4 is further than the third distance d3, the third distance d3 is further than the second distance d2, and the second distance d2 is further than the first distance d1. That is, all of the distances are different, thus enabling the object-detection sensors 404-407 to be distinguished from one another and associated with positions on the vehicle. In this example, the lateral component of each of the distances d1-d4 is also different.

It may be preferable for the marker to be a minimum distance from the vehicle during calibration (for example, 1 meter). It may also be preferable for the marker to be kept at a fixed position with respect to the vehicle during the determination of a set of values. The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processing module (such as one or more CPUs). The term processing module includes microprocessing modules, microprocessing modules, processing module modules or subsystems (including one or more microprocessing modules or microprocessing modules), or other control or computing devices. A processing module can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processing module, look-up table, microprocessing module, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A processing module for an object-detection system for a vehicle that comprises a plurality of sensor locations and a plurality of object-detection sensors, each object-detection sensor mounted at a corresponding one of the plurality of sensor locations, the processing module configured to, in a calibration mode:

receive, from each of a plurality of the object-detection sensors, a value associated with the detection of a marker;

determine the corresponding sensor location for each of the object-detection sensors based on the received values associated with the detection of the marker, wherein the corresponding sensor location is unknown to the processing module prior to said determining, each object-detection sensor comprises a memory storing a pre-assigned, unique identifier, each unique identifier comprises a machine address for identifying a particular object-detection sensor during communications with the processing module; and reassign respective unique identifiers of one or more of the object-detection sensors based on the received values associated with the detection of the marker.

2. The processing module of claim 1 further configured to, in the calibration mode, associate, for use in a sensing mode, each of the object-detection sensors with the determined corresponding sensor location of that particular object-detection sensor.

3. The processing module of claim 1 further configured to associate each of the plurality of object-detection sensors to one of a plurality of pre-designated possible sensor locations based on the values associated with the detection of the marker.

4. The processing module of claim 1, in which each value associated with the detection of the marker comprises one of:
  (i) a distance or relative distance between one of the object-detection sensors and the marker, or a related quantity such as a time of flight measurement;
  (ii) a vector defining a relationship between the object-detection sensors and the marker; or
  (iii) a time at which one of the object-detection sensors detected the marker.

5. An object-detection system having:
  the processing module of claim 1; and
  a plurality of object-detection sensors, each object-detection sensor configured to detect a marker.

6. The object-detection system of claim 5, wherein the object-detection sensors are mutually interchangeable.

7. The object-detection system of claim 6, wherein the object-detection sensors each have the same connector configuration.

8. A vehicle comprising the object-detection system of claim 5.

9. A method for calibrating an object-detection system for a vehicle comprising a plurality of sensor locations and a plurality of object-detection sensors, the method comprising:
  receiving, from each of a plurality of the object-detection sensors, a value associated with the detection of a marker; and
  determining a corresponding sensor location for each of the object-detection sensors based on the received values associated with the detection of the marker, wherein
    each object-detection sensor is mounted at a corresponding one of the plurality of sensor locations, and
    the corresponding sensor location is unknown prior to said determining,
    each object-detection sensor comprises a memory storing a pre-assigned, unique identifier,
    each unique identifier comprises a machine address for identifying a particular object-detection sensor during communications with the processing module; and
  reassigning respective unique identifiers of one or more of the object-detection sensors based on the received values associated with the detection of the marker.

10. The method of claim 9, wherein the marker is situated off-centre with respect to the vehicle.

11. The method of claim 9, further comprising:
  determining a set of first values associated with the detection of the marker by each of the object-detection sensors; and
  assigning the position of each of the object-detection sensors based on the set of first values.

12. The method of claim 11 further comprising determining whether the same first value has been determined by two or more of the object-detection sensors.

13. The method of claim 12 further comprising moving the marker with respect to the object-detection system;
  determining a set of second values associated with the detection of the marker by each of the object-detection sensors; and
  assigning the position of each of the object-detection sensors based on the set of first values and the set of second values.

* * * * *